April 8, 1969   J. R. CLARK   3,437,350

SAFETY GUARD FOR STEERING WHEELS

Filed July 29, 1968

INVENTOR
JAMES R. CLARK

BY Watson, Cole, Grindle & Watson
ATTORNEYS

United States Patent Office 3,437,350
Patented Apr. 8, 1969

3,437,350
SAFETY GUARD FOR STEERING WHEELS
James R. Clark, 519 Margaret Ave.,
Johnstown, Pa. 15905
Filed July 29, 1968, Ser. No. 748,411
Int. Cl. B62d 1/04; B60r 27/00
U.S. Cl. 280—150                                7 Claims

ABSTRACT OF THE DISCLOSURE

A safety guard for removable attachment to steering wheel rims in a flexed position above the plane of the steering wheel by means of finger-like tension grippers to absorb impacts. The tension grippers securely mount the safety guard at spaced intervals around the rim and are formed to apply a positive gripping pressure to the rim under impact.

---

The present invention relates to a safety guard and, more particularly, to a flexible safety guard for use on motor vehicle steering wheels to protect the driver from incurring an injury by violently contacting the steering shaft and steering wheel.

Ever since automobiles have been mass produced, efforts have been made to develop and provide satisfactory protection for the driver of an automobile to prevent him from coming into violent contact with either the steering wheel and/or the steering post. Such efforts have resulted in many and varied types of safety cushions or safety guards, many of which have been adapted to be secured to the steering wheel of the automobile. Although these prior safety devices have generally been satisfactory, there is still a need for a simple and inexpensive, but yet highly reliable, safety guard for the above purposes.

The improved safety guard of this invention is not intended to replace a safety belt, which is coming into widespread use, especially since the passage of Federal Legislation requiring new automobiles to be equipped with safety belts. It is intended to be used in conjunction with a safety belt to provide additional protection for the upper body portions of the driver which may strike the steering wheel or steering post because most safety belts are secured about the hips of the driver.

It is a primary object of the present invention to provide a new and improved safety device which is readily attachable to the rim of a steering wheel to protect the driver of the automobile from injury caused by impact with the steering wheel or steering post.

Another object of the present invention is to provide such a safety device for the steering wheel of an automobile which is inexpensive and which may be manufactured as an integral structure.

Yet another object of the present invention is to provide a safety device of the type described which is suitable for use on a number of different types and sizes of steering wheels.

A further object of the present invention is to provide a safety device for the steering wheel of an automobile which prevents injury by flexing to absorb the impact forces of the driver.

According to the present invention, a safety device comprises an integral structure formed of unbreakable plastic or tempered synthetic rubber which may take the shape of a ring-like member having spokes extending outwardly therefrom with each spoke including a crowfoot tension grip at its end portion. The diameter of the safety device is larger than the diameter of the steering wheel so that each spoke has to be flexed downwardly to meet the rim of the steering wheel which raises the central portion of the safety device above the rim of the steering wheel and the steering wheel post. An impact upon the surface of the safety guard is then absorbed by the flexing of the guard in a direction toward the steering wheel. The height of the guard from the plane of the steering wheel is determined by the initial flexing of the guard when it is attached to the steering wheel rim. This height is determined by the difference in diameters between the guard and the steering wheel rim.

The crowfoot tension grips at each end portion of the spoke members comprise slotted ring-like elements which are preferably constructed to be of slightly less diameter than the rim of the steering wheel. The crowfoot tension grips are fitted onto the rim of the steering wheel through the slot and forced onto the rim of the wheel by suitable pressure. The tension grips are preferably angled with respect to each spoke member so that when the safety device is in a flexed position, i.e., installed on the steering wheel rim, the crowfoot tension grips extend substantially normal to the plane formed by the rim of the steering wheel. The safety device resists the impact pressure by flexing in a downward direction toward the plane of the rim and, in so doing, causes the gripping pressure of the tension grips to increase, thereby insuring that the safety device will not be dislocated from the rim of the steering wheel as a result of receiving a severe impact.

The features of the present invention which are believed to be novel are set forth with particularity in the appended claims. The structure of the present invention, together with further objects and advantages thereof, are best understood by reference to the following description, taken in connection with the accompanying drawings, in which:

Figure 1:
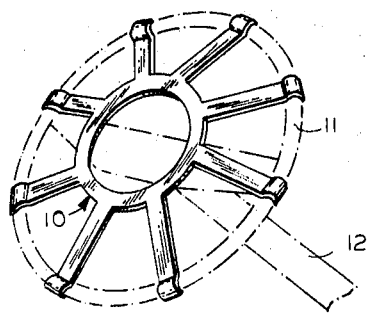
FIGURE 1 is a perspective view showing the safety device of the invention in its flexed position on the steering wheel of an automobile.

With reference to FIGURE 1, the safety device, generally designated by numeral 10, is shown in a perspective view as being attached to rim 11 of a steering wheel which includes steering post 12. Safety device 10 is flexed upwardly from the plane of steering wheel 11 to absorb any impacts which it may receive from the chest or head of a driver by flexing in a downward direction toward the steering wheel.

Figure 2:
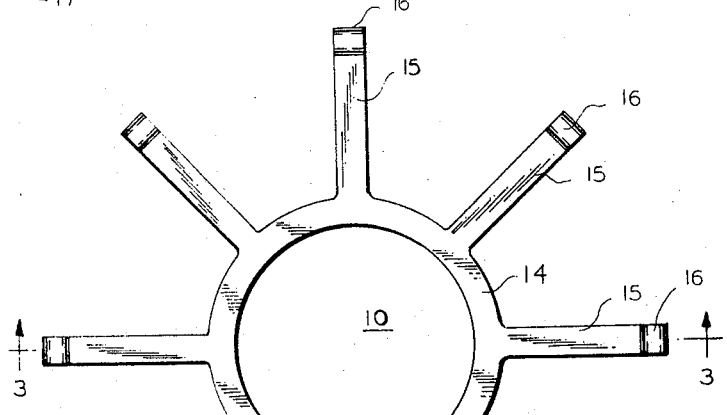
FIGURE 2 is a plan view of a preferred embodiment of the safety device.

A preferred embodiment of safety device 10 is shown in FIGURE 2 as comprising an annular element 14 which has a plurality of integral spoke members 15 extending outwardly therefrom. In this embodiment, there are eight spoke members 15 which are positioned with diametric symmetry around the circumference of ring-like element 14. Each spoke 15 includes a crowfoot tension grip 16 at its outer end portion. Tension grips 16 provide the means by which safety device 10 is attached to the rim of the steering wheel.

Figure 3:
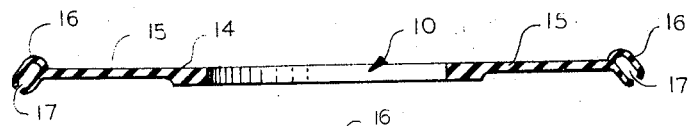
FIGURE 3 is a cross-sectional view of the safety device taken along the lines 3—3 shown in FIGURE 2.

As shown in FIGURE 3, each of the crowfoot tension grippers 16 is substantially ovally shaped and hollow with a slot 17 formed at one end of the major axis of the gripper to provide a means for engaging the rim of the steering wheel. The major axis of each tension gripper 16 forms an angle of approximately 45° with the plane of the safety device 10 in its unflexed position as shown in FIGURE 3. This angle is not critical and can be varied depending upon the diameter of safety device 10 with respect to the diameter of the steering wheel on which it is to be mounted to maximize the gripping tension which is enhanced by the forces generated by the flexing of the guard when it is positioned on the steering wheel.

Safety device 10 is preferably of an integral construction and made of unbreakable plastic or tempered synthetic rubber. The thickness of the material forming safety devices 10 will depend to a certain extent upon the type of material from which it is constructed. Material having a higher flexibility will be required to be thicker than material having a lower degree of flexibility in order to provide the necessary flexing movement to absorb the impact of the driver against the safety device in its flexed position on the steering wheel. It is readily apparent that the safety device may be economically and easily constructed in one piece perhaps by a molding process which is known to those skilled in the art. The fact that the safety device is of integral construction makes it relatively inexpensive and economical to produce since there are no assembly operations, etc.

It is also readily apparent to those skilled in the art that the safety device may take forms other than that of the preferred embodiment which is herein described. Furthermore, the central opening within annular element 14 may also consist of web-like members to prevent the head of the driver from passing therethrough and striking the steering post. Additionally, the spoke members 15 may be longer, or shorter, and the diameter of ring-like element 14 may be made smaller or larger as desired. The aforementioned factors may be altered if it is kept in mind that as the length of spoke members 15 is increased, their flexibility increases for a given material and, consequently, spokes 15 may have to be wider and thicker if their length is extended. Conversely, if spokes 15 are shortened, then the thickness and width of the material forming the spokes may be decreased accordingly. However, in practice, it is preferable to manufacture the guard of uniform thickness to avoid any unnecessary complications in its construction.

Figure 4:
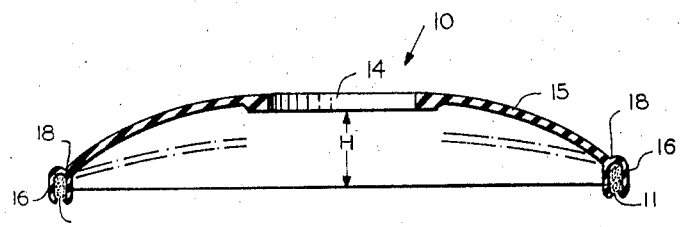
FIGURE 4 is a cross-sectional view of the safety device in its flexed position taken along a diameter of the device.

Since safety device 10 has a diameter which is greater than the diameter of the rim of the steering wheel to which it is to be mounted, the mounting of the safety device on the rim of the steering wheel causes it to assume an upward deflection from the plane of the steering wheel as shown in FIGURE 4. As shown in FIGURE 4, tension grippers 16 are firmly secured to rim 11 of the steering wheel. In this flexed position the connecting portion 18 of spoke 15 with tension grippers 16 makes an angle of approximately 45° with the plane formed by the steering wheel rim 11 for the purpose of equalizing the forces exerted on tension grippers 16 as safety device 10 is flexed downwardly towards the plane of the steering wheel when it receives an impact force. This insures that the tension grippers 16 will maintain their hold on steering wheel rim 11 and prevent safety device 10 from being dislocated and being rendered inoperative.

The height H of safety device 10 from the plane of the rim must be sufficient so that annular element 14 and spokes 15 may be flexed downwardly under impact in order to provide a resistance to impact force without engaging any portion of the steering wheel or the steering post. It is apparent that height H depends upon the diameter of safety device 10 with respect to the diameter of the steering wheel rim. The greater the difference in diameter, the greater will be the flexing of safety device 10 and its height H above the plane of the rim. Conversely, the smaller the difference in the diameter, the smaller height H becomes. The greater the flexibility of the material of which the safety device is constructed, then the greater height H must be in order to enable the material to flex before it comes in contact with any portion of the steering wheel or the steering column.

In practice, the interior walls of grippers 16 may be serrated in order to provide a firmer grip on the steering wheel rim. It is also apparent that the safety device may be colored in order to blend in with the interior design of the particular automobile in which it is to be used. Furthermore, the shape of the crowfoot grippers may be varied to accommodate the different cross-sectional shapes of steering wheel rims which are used in the automobile industry.

The particular safety device herein shown and described in detail is fully capable of attaining the objects and providing the advantages hereinbefore stated, and it is to be understood that such description is merely illustrative of the presently preferred embodiment of the invention and that no limitations are intended to the details of construction or design herein shown other than as defined in the appended claims.

What is claimed is:
1. A safety guard for a steering wheel, comprising;
   a flexible frame having a larger diameter than the steering wheel rim, and
   means integral with the outer peripheral portions of said flexible frame mounting the frame to the rim of the steering wheel so that the frame is flexed upwardly from the plane of the steering wheel rim to absorb impact generated from contact with the driver's body.
2. A safety guard according to claim 1 wherein the means mounting the frame secure the frame to the rim by means of the tensive forces exerted by said frame and mounting means on the rim.
3. A safety guard according to claim 2 wherein said mounting means include at least one pair of finger-like elements extending from said frame, said pair of elements forming an aperture having a cross-section smaller than the cross-section of said rim whereby said finger-like elements exert a gripping force on the rim.
4. A safety guard according to claim 3 wherein said pair of finger-like elements extend outwardly from the periphery of said frame and form an angle of substantially 45° with the normal to the plane formed by the steering wheel rim.
5. A safety guard according to claim 3 wherein said finger-like elements consist of a plurality of paired elements equidistantly spaced around the periphery of said frame.
6. A safety guard according to claim 5 wherein each of said paired elements forms an ovally shaped cross-section and includes an aperture to provide engagement with the steering wheel rim.
7. A safety guard for steering wheels, comprising;
   an annular member,
   a plurality of spoke-like elements integral with said annular member and extending outwardly along different radii of said annular member,
   mounting means integral with said spoke-like elements at their respective end portions,
   said annular member, said spoke-like elements and said mounting means forming a resilient semi-rigid structure, and
   said means for mounting include paired finger elements integral with a respective spoke-like element, each of said paired finger elements forming an aperture, each of said finger elements forming an angle of substantially 45° with a respective spoke-like element and being resilient to resist an alteration in the shape of said aperture.

References Cited
UNITED STATES PATENTS 2,866,357  12/1958  Houghtaling _____ 74—552
3,055,231  9/1962   Daniel _____ 74—552

LEO FRIAGLIA, *Primary Examiner.*

R. R. SONG, *Assistant Examiner.*

U.S. Cl. X.R.

74—552